United States Patent
Shiraishi

(10) Patent No.: US 8,009,698 B2
(45) Date of Patent: Aug. 30, 2011

(54) RECEIVING APPARATUS, RECEIVING METHOD, COMMUNICATION METHOD AND TRANSMISSION APPARATUS

(75) Inventor: Daisuke Shiraishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 12/464,718

(22) Filed: May 12, 2009

(65) Prior Publication Data

US 2009/0285238 A1     Nov. 19, 2009

(30) Foreign Application Priority Data

May 19, 2008   (JP) ................... 2008-131274

(51) Int. Cl.
*H04J 3/24* (2006.01)

(52) U.S. Cl. ....................................... 370/474

(58) Field of Classification Search ........... 370/394, 370/395.52, 428–429, 469–476
See application file for complete search history.

(56) References Cited

U.S. PATENT DOCUMENTS

| | | | |
|---|---|---|---|
| 5,892,753 A * | 4/1999 | Badt et al. ................ | 370/233 |
| 5,931,961 A * | 8/1999 | Ranganathan et al. ........ | 714/712 |
| 6,212,190 B1 * | 4/2001 | Mulligan ................ | 370/400 |
| 6,934,288 B2 * | 8/2005 | Dempo ................ | 370/394 |
| 7,355,971 B2 * | 4/2008 | Jason, Jr. ................ | 370/231 |
| 2003/0188015 A1 * | 10/2003 | Lee et al. ................ | 709/238 |
| 2009/0225757 A1 * | 9/2009 | Imao ................ | 370/392 |
| 2010/0008380 A1 * | 1/2010 | Ooshima ................ | 370/474 |
| 2010/0014542 A1 * | 1/2010 | Ooshima ................ | 370/474 |

FOREIGN PATENT DOCUMENTS

JP   2003-18216   1/2003

OTHER PUBLICATIONS

DARPA, Internet Protocol, RFC 791, 52 pages, Sep. 1981.*
Mogul et al, Path MTU Discovery, RFC 1191, 20 pages, Nov. 1990.*
RFC791 "Internet Protocol", Sep. 1981, www.ietf.org.rfc/rfc0791.txt.

* cited by examiner

*Primary Examiner* — Frank Duong
(74) *Attorney, Agent, or Firm* — Fitzpatrick, Cella, Harper & Scinto

(57) ABSTRACT

A receiving apparatus receiving data separated into a plurality of fragments comprises a detection unit adapted to detect the fragment size of the fragments, and a management unit adapted to manage the arrival status of the plurality of received fragments using the detected fragment size as a unit.

9 Claims, 7 Drawing Sheets

RECEIVING APPARATUS, RECEIVING METHOD, COMMUNICATION METHOD AND TRANSMISSION APPARATUS

BACKGROUND OF THE INVENTION

1. Field of the Invention

The present invention relates to a receiving apparatus, a receiving method, a communication method and a transmission apparatus that receive data separated in to a plurality of fragments.

2. Description of the Related Art

Internet Protocol (hereinafter: IP) has been well used in network layer (internet layer) of computer networks. The Internet Protocol stipulates transmitting an IP datagram separated into parts called fragments by the transition apparatus, and reassembling the fragments received by the receiving apparatus as described in RFC791 "Internet Protocol" (www.ietf.org/rfc/rfc0791.txt).

The fragmenting and reassembling of IP datagram are processes conducted for enabling large packet transmission through a communication path, even when a communication link that only allows small packets, is included in the communication path.

In case of conducting fragmenting and reassembling of IP datagram on received data, the receiving apparatus has to recognize which fragments have been received and which fragments have not being received.

The identification of already received fragments is usually conducted using the fragment block hit table (hereinafter: bit table) as described in RFC791. Bit table is a table with each byte in the bit table having a correspondence to a data fragment that constructs the IP datagram. Receiving apparatus set a byte (as an example setting to "1") of the bit table responsive to the received fragment, allowing identification of the already received fragments.

In case of conducting bit table base reassembling, the data receiving apparatus needed to reserve 8192 byte size bit table. This is due to the fact that the maximum payload of the IP datagram is 64K and the minimum size of the fragment size is 8 byte, while data receiving apparatus unable to know the size of the IP datagram and fragment size. Payload of IP datagram size can be in the range lower the 64K, and fragment size can be in the range higher than 8 byte. However, if 64K byte IP datagram is being separated in to 8 byte units, receiving apparatus need to reserve 8192 (64 Kbyte/8 byte) size bit table.

As explained above, in conventional architecture, even in case IP datagram size is less than 64K and/or fragment size is more than 8 byte (as a example 1K byte) the receiving apparatus need to reserve a bit table in the size of 8192. However, a limitation such as above, in case the payload of IP datagram is less than 64 or in case the fragment size is larger than 8 bytes, creates wasteful reservation of memory for the bit table.

Moreover, because reassembling process is a process associated with a heavy processing load, the process has to be implemented on high speed and expensive SRAM and the like. Thus, the conventional bit table area reserving architecture is possibly allows wasting expensive SRAM areas.

SUMMARY OF THE INVENTION

The present invention makes it possible to minimize the size of the circuit that manages the fragmented packets.

Moreover, the present invention provides a receiving apparatus that receives data separated into a plurality of fragments comprising, a detection unit for detecting the size of the fragment, and a management unit for managing the status of arrival of the received plurality of fragments based on the detected fragment unit size.

According to one aspect of the present invention, a receiving apparatus receiving data separated into a plurality of fragments comprises: a detection unit adapted to detect the fragment size of the fragments; and a management unit adapted to manage the arrival status of the plurality of received fragments using the detected fragment size as a unit.

According to another aspect of the present invention, a receiving method for receiving data separated into a plurality of fragments comprises the steps of: detecting the fragment size of the fragments; and managing the arrival status of the plurality of received fragments using the detected fragment size as a unit.

According to still another aspect of the present invention, a communication method for communicating data separated into a plurality of fragments comprises the steps of: at a transmission apparatus, transmitting a plurality of fragments; and at a receiving apparatus, detecting the fragment size of the fragments, and managing the arrival status of the plurality of received fragments using the detected fragment size a unit.

According to yet another aspect of the present invention, a transmission apparatus for transmitting data that is separated into a plurality of fragments to a receiving apparatus comprises: a fragmentation unit adapted to fragment transmission data into fragments with a predetermined size; and a notification unit adapted to notify the receiving apparatus of the predetermined size and an information representing the necessity of setting the predetermined size.

Further features of the present invention will become apparent from the following description of exemplary embodiments (with reference to the attached drawings).

DESCRIPTION OF THE EMBODIMENTS

Embodiment of the present invention will now be described with reference to the attached drawings. It should be noted that the figures that show architecture of the embodiments are merely examples; the technical scope of the present invention is defined by the claims and is not limited by the embodiment described below. In addition, not all combinations of the features described in the embodiments are necessarily required for realizing the present invention.

Figure 1:
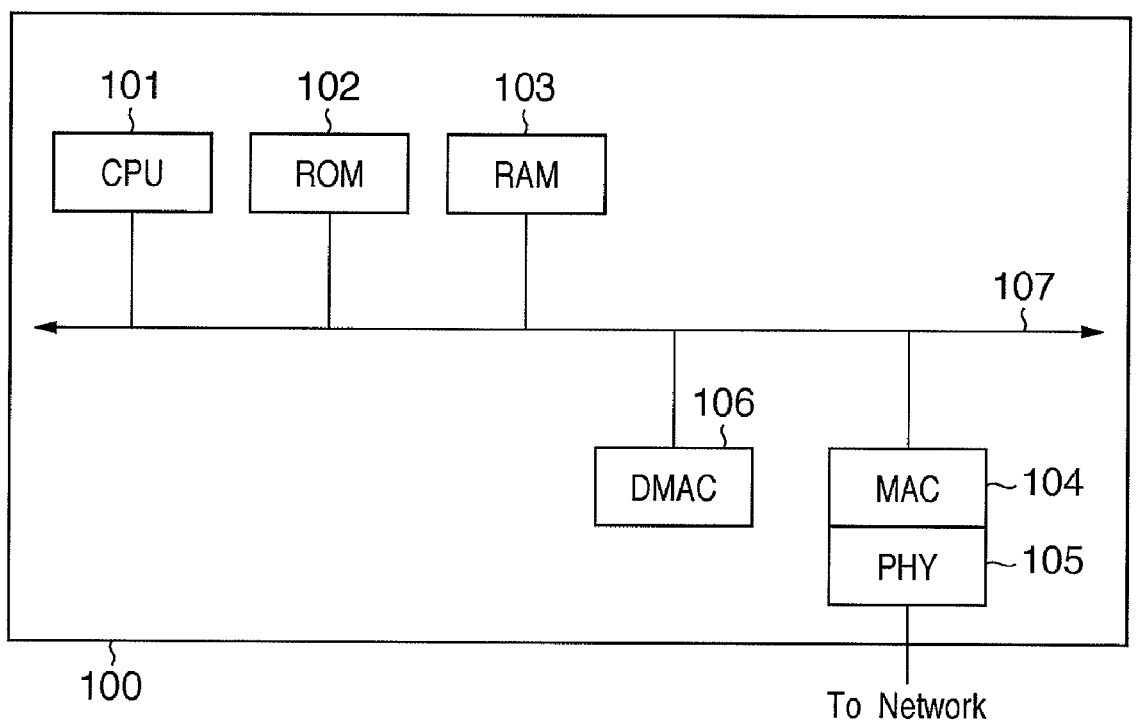
FIG. 1 shows system architecture of the network protocol processing apparatus.

FIG. 1 shows a network protocol control apparatus according to the present invention. This network protocol processing apparatus 100 is a communication system comprised with a unit that transmits IP datagram (packets) and a unit that receives IP datagram (packets) and function as at least a receiving apparatus or a transmitting apparatus.

101 in FIG. 1 is a CPU that controls the operations of network protocol control apparatus by executing software compliant with TCP/IP standards. 102 is a ROM which stores the software that executing in CPU 101. 103 is a RAM, exclusively used as an execution work area of CPU 101.

104 is a MAC (Media Access Controller) and 105 is a PHY (PHYsical layer) that control the communications under media layer. 106 is a DMAC (Direct Memory Access Controller), that coordinates received TCP/IP network data transfer between RAM 103 and MAC 104. 107 is a data bus that interconnects CPU 101, ROM 102, RAM 103, MAC 104 and DMAC 106.

Generally, RAM 103 is constructed with inexpensive DRAM (Off Chip), however, it may be constructed with expensive DRAM (On chip). Since on chip SRAM are expensive, it may be difficult to install a SRAM as RAM 103 with the size that is able to store all the data considered in the present invention. In such a case, it may be possible to implementing the RAM 103 by combining inexpensive off chip DRAM with expensive, on chip, high speed SRAM, where frequently accessed data and network protocol processes is executed on SRAM; other data is executed in DRAM. In present embodiment, RAM 103 can be DRAM and on chip SRAM, or other recording medium, the term RAM 103 includes all the variations.

Here, RAM 103 is not being used as an execution work area of CPU 101, instead, used as an area that saves data used for TCP/IP network protocol processes. The aforementioned data includes transmitting and/or receiving data, bit table data that will be discussed later and the bit table management information table etc. according to TCP/IP network communication. Hereinafter, management information table is referred to as a management table. Moreover, each bit table management information saved in the management table is called a management entry.

Figure 2:
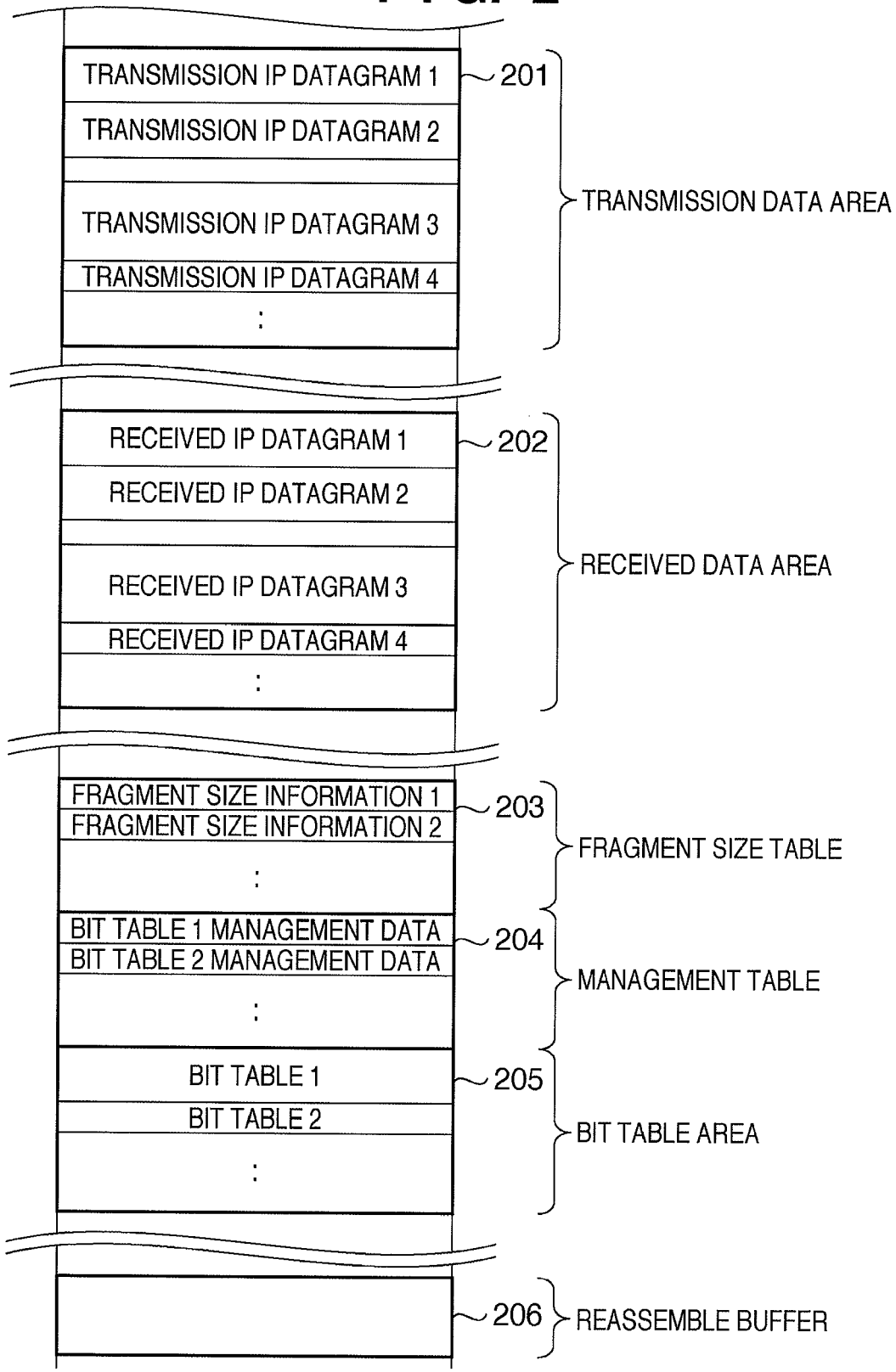
FIG. 2 shows an internal data construction of the RAM 103.

FIG. 2 is a figure that represents the data structure of the RAM 103. Since the FIG. 2 only represents the minimum information necessary for explaining the embodiment according to the present invention, there may be information that is not represented in the figure even though it is necessary for network protocol processing. As an example, information such as work data processed by the CPU 101 can be given, and not represented in the figure.

In FIG. 2, 201 is the transmission data area that stores IP datagram (packet) that has to be transmitted. 202 is the received data area that stores IP datagram (packet) that has been received. 203 is the fragment size table that stores the fragment size information. 204 is a management table that stores Bit Table management information which is called management entry. Management entry along with the corresponding bit table is mainly created at the reassemble process starting time, and stores the IP datagram information corresponding to reassemble process. 205 is a bit table area and stores the bit table itself. All the bit tables have a one to one correspondence with predefined management entry.

206 is a reassemble buffer that stores the currently reassembled IP datagram payload data. There are various methods available for storing currently reassembled IP datagram payload data into reassemble buffer 206. The fragmented payload data currently reassembled is not arriving one after another from the first fragment of the payload data. There are cases where copies of already received payload data parts arriving once again. Because of this reason, as a general storing method, reserving data area of a 64 KB which is the maximum payload size prior to fragmentation at the time reassemble process is started, and then assigning the received payload data as it arrives to the corresponding location is conducted.

As another method, using the link list can be given. In this method, when the data is segmented in to pieces, by separately managing the information of the data storage position of a piece of data continued after a predefined data, the data is shown continuously.

In general, the previous method is being used when reassemble process is conducted by hardware, in case of conducting reassemble process by software the latter is used. The reassemble buffer management can be conducted with, above mentioned methods, or any other method that allows recreation of payload data before fragmentation.

The transmission data area 201 is mainly used when network protocol processing apparatus 100 is functioning as a transmitting unit. On the other hand, received data area 202, fragment size table 203, management table 204, Bit Table area 205, and reassemble buffer 206 are mainly used when network protocol processing apparatus 100 is used as a receiving apparatus.

Figure 3:
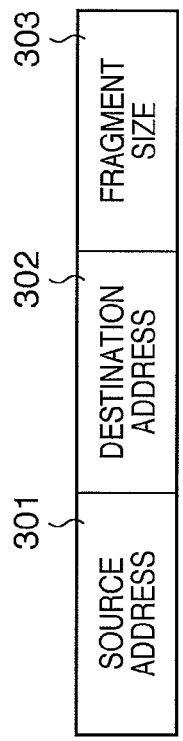
FIG. 3 shows a data construction of fragment size information.
Figure 4:
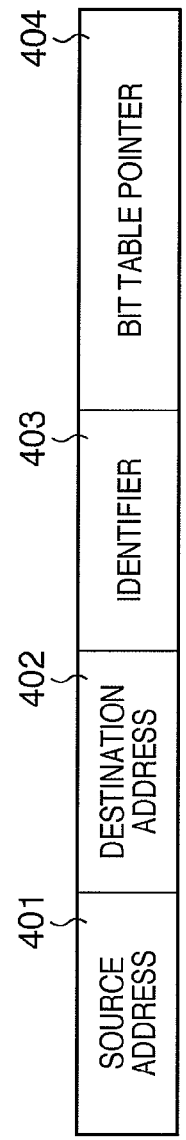
FIG. 4 shows a data construction of management entry.
Figure 5:
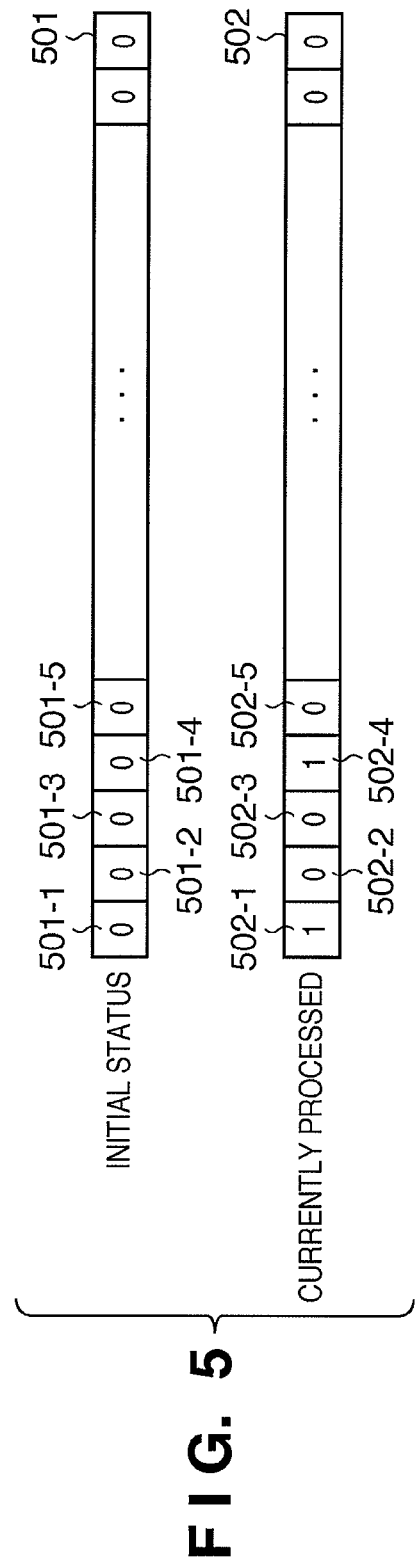
FIG. 5 shows a data construction of Bit Table.

Next while using FIG. 3, FIG. 4 and FIG. 5, the relationship between fragment size information within fragment size table 203, management entry within management table 204, and bit table within Bit Table area are explained. FIG. 3 shows the details of fragments size information stored in fragment size table 203. FIG. 4 shows the details of management entry stored in management table 204. And FIG. 5 shows the details of Bit Table stored in Bit Table area 205.

301 in FIG. 3 represents a source address; it directly corresponds to the source address stored in IP header. 302 is a destination address; similarly it directly corresponds to the destination address stored in IP header destination field. 303 is the fragment size; it directly corresponds to the fragment size set within options of IP header. Fragment Size 303 is the unit size used in bit table used for reassemble process, and shows the number of bytes corresponding to 1 bit in the bit table.

401 in FIG. 4 represents a source address; it directly corresponds to the source address stored in IP header. 402 is a destination address; similarly it directly corresponds to the destination address stored in IP header destination field. 403 is an identifier; it directly corresponds to the identifier stored in IP header. Source address 401, destination address 402, and identifier 403 are used for recognizing the IP datagram subjected to the reassemble process. 404 is a Bit Table pointer that point to stored address of Bit Table RAM 103 that linked with the aforementioned management entry.

501 in FIG. 5 represents the bit table itself at an initialization stage, and 502 represents the Bit Table while conducting predetermined reassemble processes. Each bit of the Bit Table (501-1~501-5, 502-1~502-5 etc.) represent whether payload has been received or not, in case "1" is set the payload has being received. On the other hand, when "0" is set the payload has not being received. Since none of the payload data has being received at the initialization time, all the bits are set to "0".

Here, the relationship between fragment size 303 and Bit Table is explained using an example. A fragment with predefined fragment size 303 is considered to be 1 KB (=1024 byte). Additionally, the bit table linked to management entry that corresponds to aforementioned fragment information's source address 301 and the destination address 302 to the source address 401 and destination address 402, is considered to be in the status of 502. Here, this bit table is corresponding to the storage location address bit table indicated by pointer 404.

At this moment, each bit 502-1, 502-2, 502-3, 502-4 and 502-5 is corresponding to a payload of 1 KB. Therefore, the bit 502-1 is set to "1" to indicate it has already received 1 KB data from the beginning of the IP datagram payload. Similarly, bit 502-2 is set to "1" to indicate it has already received 1 KB data part from the start of the 3 KB offset. In contrary, the bits 502-2, 502-3 and 502-5 are set to "0" to indicate that they have not received the 1 KB predefined portion of the data yet. Using such a method, bit table manages the status of arrival of fragments for each fragment size.

In the present embodiment of the invention, an evaluation datagram including fragment size transmitted by the transmitting apparatus enable the MTU (Maximum Transmission Unit) search of the communication path up to receiving apparatus. Then, the data is fragmentized into IP datagram of the received fragment size that included in the datagram for evaluation, and then these IP datagram is transmitted to each receiving apparatus one after the other. Here, as discussed later, receiving apparatus can, while conducting MTU search processes, know a MTU equal to the fragment size. As above, in the embodiment of the present invention, since the receiving apparatus can know the fragment size of the fragment before receiving, the minimum Bit table necessary can be set according to the fragment size.

MTU search process according to the embodiment of the present invention is explained as below. In network protocol communication that uses IP as communication protocol, the Maximum Transmission Unit (MTU) of the data link layer (the layer below network layer) is decided based on the protocol used in the data link layer. Because of this reason, transmission apparatus needed to divide the data transmitted by IP into fragments smaller than lower layer MTU. This fragmentation process requires large processing power. Therefore, to make intermediate fragmenting unnecessary within the communication path, transmitting apparatus evaluates the MTU of the communication path (path MTU) up to the receiving apparatus, and use fragments smaller than the path MTU. Moreover, path MTU for IPv4 is standardized according to RFC1191. Searching process of the path MTU is called "path MTU search".

In path MTU search, first, source apparatus transmits a relatively big datagram with a non-fragmentation flag. When this datagram is received by a router apparatus it checks the MTU of the next path to evaluate whether fragmentation is needed. When fragmentation is needed, because of the non-fragmentation flag is set, router apparatus discards the IP datagram and an unreachable message of ICMP (Internet Control Message Protocol) is sent to the source apparatus. In this unreachable message the MTU size of the next path from the route is included. Then the source apparatus sends out a second datagram with size smaller than this MTU value with a not-fragmentation flag. The source apparatus conducts the path MTU search by repeating this process until the datagram reaches the destination apparatus.

In particular, as an example, based on reception or non-reception of the corresponding ICMP reply of sent ICMPecho, examining the path MTU is being disclosed (as an example Japanese Patent Laid-Open No. 2003-018216). Here, DF (fragmentation is not allowed) flagged ICMPecho is sent while changing the IP packet size, and then the path MTU is examined based on the received ICMP reply from receiving apparatus that corresponding to the ICMPecho.

Figure 6:
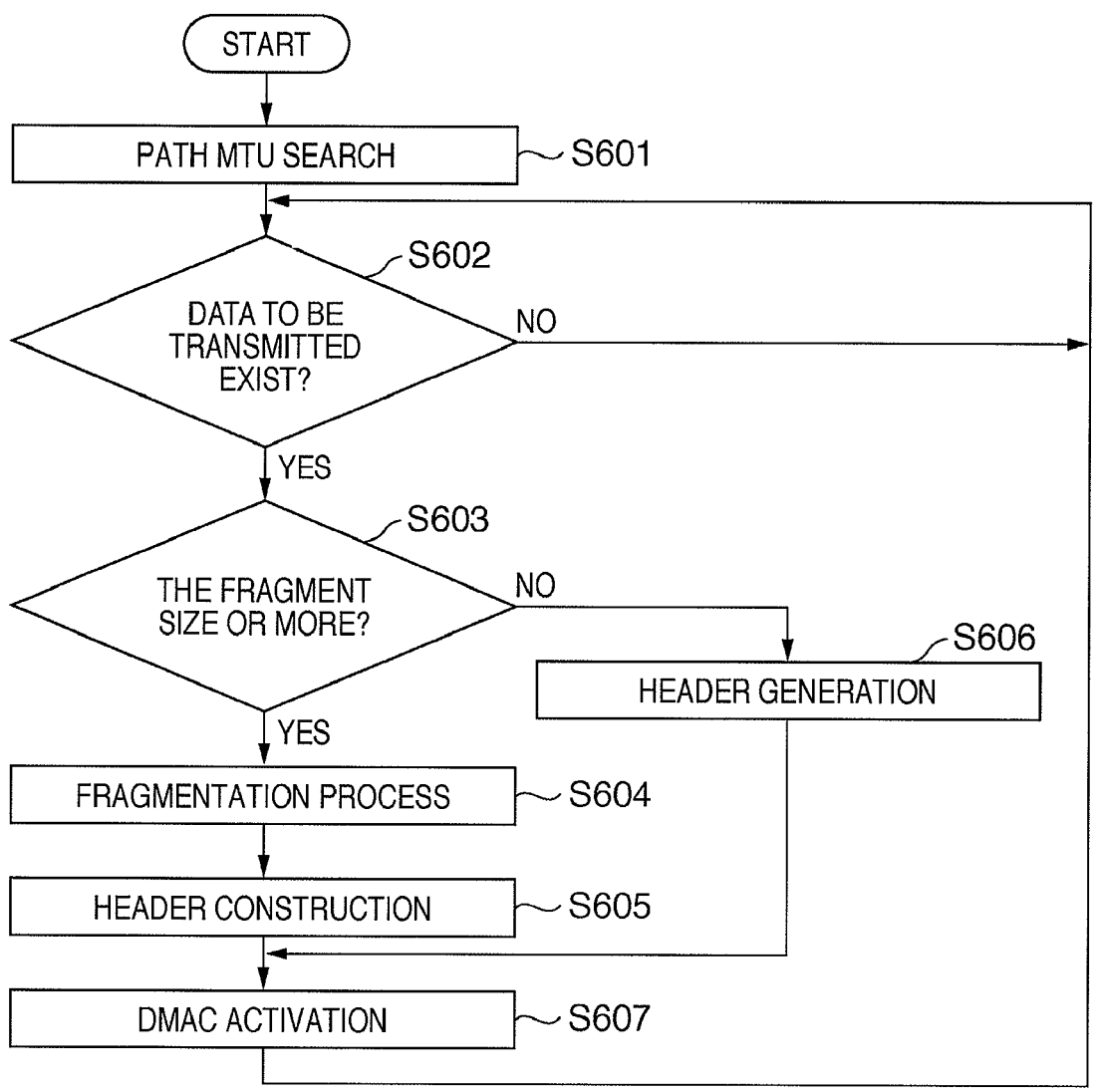
FIG. 6 shows a flow chart that shows the transmission process flow of IP datagram.

Next, the network protocol processing apparatus shown in FIG. 1 according to the first embodiment of the preset invention is explained. First, the case where protocol processing apparatus is functioning as a transmission apparatus is explained using FIG. 6. FIG. 6 is a flow chart that represents the process flow of transmission process.

After connection is established CPU 101 of network protocol processing apparatus 100 conducts the MTU search operations of step S601. In other words, evaluation process of the maximum transmission unit (MTU) size, in the communication path up to receiving apparatus, is conducted. In MTU evaluation, first, an IP datagram with a set non-fragmentation flag is transmitted as the evaluation datagram. Then, until the reception confirming datagram corresponding to the evaluation datagram is received from receiving apparatus, transmitting apparatus continues transmitting evaluation datagram while decreasing the size. When the reception confirming datagram is received from the receiving apparatus, the corresponding evaluated datagram size is selected as the MTU.

As an example, the DF (fragmentizing is not allowed) flagged ICMP echo is transmitted while changing the IP datagram size. Then, the path MTU is investigated based on the determination of whether the source apparatus can receive an ICMP reply corresponding to ICMP echo from the destination apparatus (receiving apparatus). The initial size of the IP datagram become the MTU value of the source apparatus, and each time the ICMP destination host unreachable message is received, MTU value is changed to the MTU value included in the received destination host unreachable message. At the transmission apparatus, when the ICMP reply from receiving apparatus is received, the values below the size of ICMP echo size corresponding to ICMP reply is set as the fragment size.

CPU 101 sets the following values in the header of a path MUT search IP datagram.

Path MTU search identifier which used for indicating IP datagram is a path MTU search conducting IP datagram. (1 byte)

the fragment size (2 byte) which indicates fragmenting size of the following IP datagram after the MTU is identified using the said path MTU search IP datagram.

Here, the fragment size is decided as follows.

Lower than (IP datagram size—20 byte) and a number dividable by 8 byte without a remainder.

Due to this, when receiving apparatus (the destination apparatus at the communication) receives a path MTU search identifier set ICM echo, the receiving apparatus knows the fragmentation size of the following IP datagram to be received. In other words, in present embodiment, by transmission apparatus transmitting an IP datagram that set to path MTU search identifier including selected fragmentation size, the receiving apparatus is able to notify the fragment size of the IP datagram to the receiving apparatus.

In step S602, CPU 101 determines whether there are any data needed to be set to data area 201 of RAM 103. In case there are data needed to be sent (YES in step S602) proceed to step S603, in case there are no data to be sent (NO in step S602) the process waits in the same status.

In step S603, the fragment size set to ICMP echo that has reached the destination apparatus at the step S601 is compared with the data size that should be transmitted in the data area 201 of RAM 103. At step S603 if data size of the data to be sent is determined as equal to or bigger than fragment size (YES in Step S603) the process proceeds to step S604, when it is smaller or equal than the fragment size (NO in step S603) the process proceeds to step S606.

In step S604, the fragmentation process of the data that should be sent by the CPU 101, is conducted. According to the fragmentation sized decided at Step S601, transmitting datagram is separated in to a plurality of fragments. Next, IP headers are added to the fragments, creating IP datagram. IP header includes source address, destination address, and identifier. This identifier is a used for identifying data before the fragmentation. And then the process proceeds to step S607.

On the other hand, data that should be send at step S603 is decided to be smaller than the fragment size (NO in step S603), by creating an IP header for the data that should be sent at the Step S606 an IP datagram is created. Then the process proceeds to step S607.

In step S607, CPU 101 executes the DMAC 106, DMAC 106 transmits the fragmented IP datagram on the RAM 103 to MAC 104 and PHY 105, and then IP datagram transmits to the network. In other words, separated a plurality of fragments are sent to receiving unit one after the other. After executing DMAC 106 for step S607, CPU 101 returns to step S602, determines whether there are data that should be transmitted in transmission data area 201 of RAM 103, in case there are data that should be transmitted the above explained steps are repeated.

Figure 7:
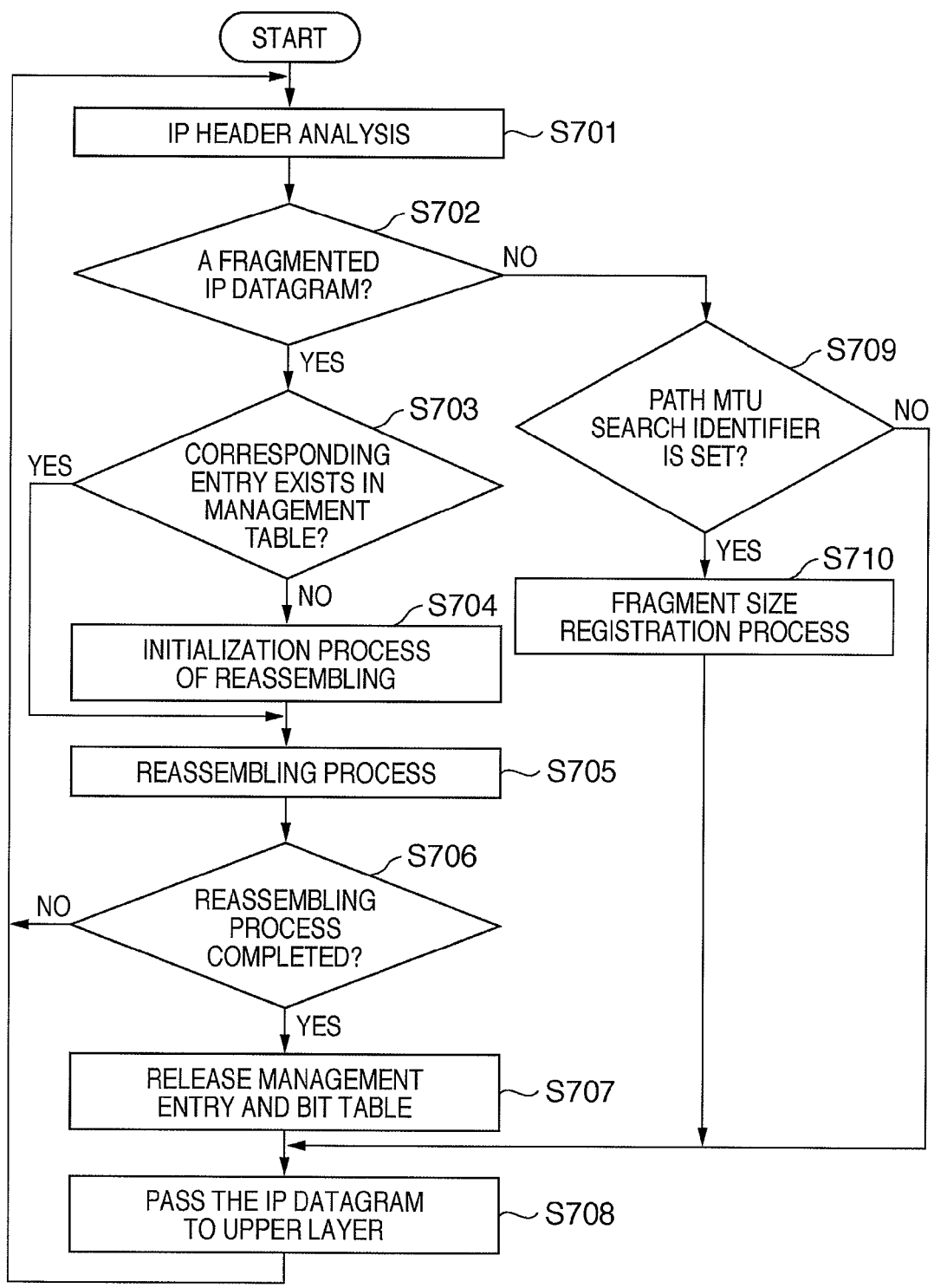
FIG. 7 shows a flow chart that shows the receiving process flow of IP datagram.

Next, the case of functioning as a receiving apparatus is explained using the FIG. 7. FIG. 7 is a flow chart that shows the process flow of the process.

Receiving apparatus receives a plurality fragments of the IP datagram (packet) sent by the transmission apparatus. When MAC 104 and PHY 105 receive IP datagram, the CPU 101 is notified with an interruption signal. When the interruption signal is received CPU 101 activates the DMAC 106, and forwards the data received as IP datagram from MAC 104 and PHY 105 to the received data area 202 of RAM 103. In case received data area 202 on RAM 103 already has data that should be processed; the receiving process is conducted according to the process flow given in flowchart of the FIG. 7.

In step S701 IP header is analyzed. In step S702, based on the analysis, process decides whether IP datagram is fragmented. Whether fragmented or not is decided using the flag MF of IP header, which represents whether there are following fragments and fragment offset field. In step S703, after data is determined to be fragmentized (YES in step S702) the process proceeds to step S703, unless (NO in step S702) the process proceeds to step S709.

Here, as explained above, transmission apparatus of the present embodiment starts IP datagram fragment transmission after MTU search. In an IP datagram set with path MTU search identifier fragmentizing restricting flag is also set. Due to this, when receiving apparatus receives IP datagram for MTU search, first the process proceeds to step S709. As explained later, the receiving apparatus evaluates the fragment size using the set fragment size of the IP datagram, source address, destination address, fragment size and etc. which is registered in fragment size table 203 (Step S710). The fragment size notified by the transmission unit is received by the MAC 104 and PHY 105.

In Step S703 management table 204 is searched, for a matching management entry to the header of the received IP datagram. The determination of whether management entry match the IP header is conducted by checking whether source address, destination address, and identifier of the IP header match source address 401, and destination address 402 and identifier 403 respectively.

In case there is no management entry matches with the above three terms, reassemble process of the received IP datagram is not yet started, in other words, it indicates the necessity of starting the reassemble process for the IP datagram with the aforementioned header. Therefore, in case management entry does not match with the IP header (NO in Step S703), in step S704, reassemble initialization process is executed.

Regarding reassemble initialization process, based on the notified breakup size (fragment size set in the IP datagram for MTU search) received from transmission apparatus, receiving apparatus reserve memory area within the bit table area 205 which manages status of arrival. As explained later, by using this bit table, status of arrival of fragments is managed for each break up size. Then, CPU 101 creates a new management entry within the management table 204; then corresponding information of the IP header is saved into the source address 401 destination address 402, and identifier 403 of the created management entry. In addition, fragment size table 203 is searched for matching fragment size information to the IP header of the received IP datagram.

Determination of whether fragment size information matches IP header is conducted by, determining whether source address and destination address inside aforementioned IP header match with the source address 301 and destination address 302 of the fragment size information respectively. In case matched, from the fragment size 303 of aforementioned fragment size information of the bit map size is extracted. More specifically, it is obtained by dividing the maximum payload size 64 KB by the fragment size.

As an example, if fragment size 303 is 1 KB, the calculated bit table size is 64 (=64 KB/1 KB) bits. In case there is no matching fragment size information in the IP header of the received IP datagram, fragment size 303 becomes 8 byte in the above calculation. Based on this bit table size, a bit table is created in the bit table area 205, and the bit table initialization is conducted. In bit table initialization, all the bits are set to "0" (non-received). Finally, the storage location address of created management entry is saved into bit table pointer 404 of created management entry, and proceeds to step S705. This reassemble processing process may be conducted after step S710 and step S708.

On the other hand, in step S703, when there is a matching management entry to source address, destination address and identifier IP header of the received IP datagram (YES in step S703), process proceeds to step S705 without passing through step S704.

Reassemble process is conducted on fragment received in step S705. That is, the status of arrival of received fragments is managed by the bit table for each break up size notified by the communication apparatus. More specifically, in reassemble process, fragment size information with matching source address 301 and destination address 302 to source address and destination address within the IP header of received IP datagram is searched. Then, the fragment size 303 is been extracted from the aforementioned fragment size information. Moreover, based on extracted fragment size 303 and fragment offset within IP header, the bit of the bit table pointed by bit table pointer 404 is set to "1". Here, received IP datagram, in case the MF flag which represents following fragmented packets is set to "0", the bits bellow the corresponding bit is set to "1" in the bit table, and then the process proceeds to step S706.

In step S706, the targeted IP datagram reassembling process is concluded or not is determined. Specifically, in case all the bits in bit table is set to "1", all the fragmented datagram is received, in other words, decided as reassemble process has concluded. Additionally, the determination method for evaluating end of reassemble process is not limited to above explained method; it may be conducted in other methods. In other words, any method that can clearly recognize the end of reassembling process may be used.

When the reassemble process of step S706 is decided to be concluded (NO in step S706), the process returns to step S701, and the process is started again when the next fragment of IP datagram is received. In step S706, in case reassemble process is determined to be concluded (YES in step S706), the process proceeds to step S707.

In step S707, CPU 101 searches for the management entry (within the management table 204) with source address 401, destination address 402 and identifier 403 that matches to the source address, destination address and an identifier contained in the IP header of received IP datagram respectively. Then, release the bit table pointed in the bit table pointer 404 within the aforementioned management entry.

After that, at Step S708, the payload data received after reassembling is passed to the upper layer. Then the process is concluded.

On one hand, in step S702, regarding datagram which are decided to be not fragmentized (NO in step S702), it is decided whether path MTU search identifier is set in IP option of IP header at Step S709. In case path MTU search identifier is set (YES in step S709) process proceeds to step S710.

In step S710, fragment size registration process is conducted by CPU 101. In fragment size registration process, CPU 101 searches for fragment size information in fragment size table with source address 301 and destination address 302 that matches to the source address, destination address and an identifier contained in the IP header of received IP datagram respectively. In case matching aforementioned fragment size information 303 exists, the fragment size information is updated using the fragment size set within the options of IP header. In case there is no matching information, CPU 101 creates new fragment size information, and records the information from the IP header corresponding to source address 301, destination address 302, and fragment size 303, and then, the process proceeds to the step S708.

On the other hand, regarding step S709, in case path MTU search identifier is not set (NO in step S709), the process proceeds to step S708, the IP datagram payload is passed to the upper layer. Upper layer is implemented with software conducting standard TCP processes; the implementation may be conducted in hardware also.

As stated above, the receiving apparatus according to the present embodiment, in responsive to receiving the breakup size from the transmission apparatus, reserving memory area for the bit table, which is for managing the status of fragment arrival that conducted based on the aforementioned received breakup size. Because of above procedure, receiving apparatus can avoid reserving an unnecessarily large bit table in the memory, and receiving apparatus is able to use memory more effectively; the necessary size of the memory reservation in receiving apparatus for bit table can be reduced.

Moreover, in receiving apparatus according to the present embodiment, the MTU searching process can be easily constructed due to break up size is detected using the fragment size set in to the path MTU search packet.

Regarding first embodiment, by conducting process as explained above, the fragment process conducting size is shared between receiving apparatus and transmission apparatus, while path MTU detection is conducted. Thus, the receiving apparatus can manage the status of arrival of fragmented IP datagram (IP packets) with a shared unit size. Therefore, reducing the size of the bit table that manages status of arrival is possible.

In first embodiment, transmission apparatus transmitted a packet set as a MTU search identifier with fragment size and notified the fragment size to the receiving apparatus. In present embodiment, notification to the receiving apparatus by recording the fragment size in IP header of each fragment of the IP datagram is explained.

The explanation of network protocol processing apparatus 100 architecture according to the present embodiment is similar to the explanation of network protocol processing apparatus architecture according to the first embodiment as given in FIG. 1; thus the detailed explanation is abbreviated. Moreover, when network protocol processing apparatus 100 is functioning as a receiving apparatus, the bit table architecture reserved in the memory is similar to the case of first embodiment explained in FIG. 5 and detailed explanation is omitted.

Figure 8:
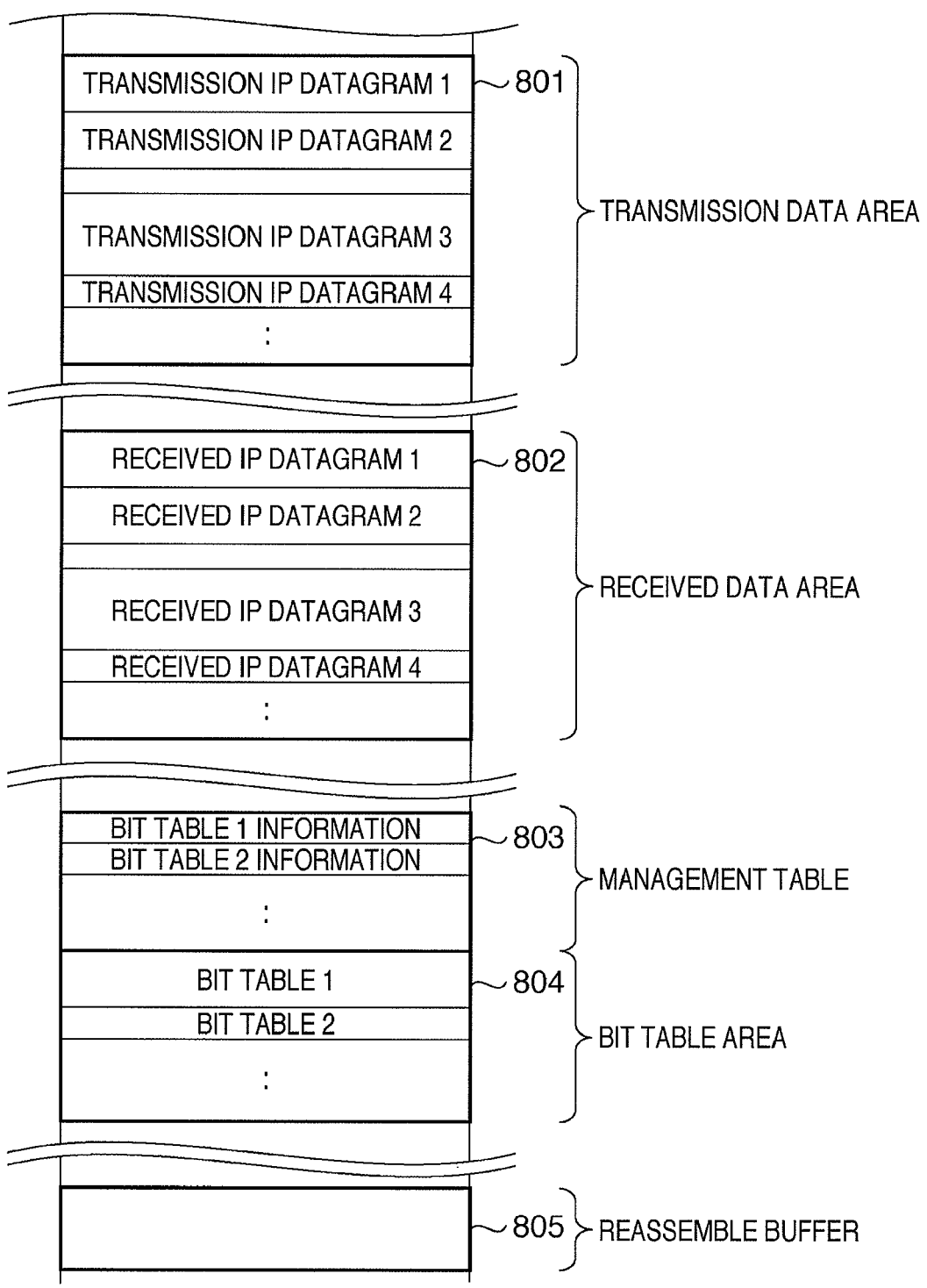
FIG. 8 shows a data construction of the RAM 103.

FIG. 8 is a figure that represents the data structure of the RAM 103 of the network protocol processing apparatus 100. Since the FIG. 8 only represents the information necessary for explaining the embodiment according to the present invention, there may be information that is not represented in the figure even though it is necessary for network protocol processing. As an example, information such as work data processed by the CPU 101 can be given and is not represented in the figure. As it can be seen by comparing FIG. 2 and FIG. 8, the present invention does not use fragment size table.

Transmission data area 801, received data area 802, Bit Table area 804, reassemble buffer 805 of FIG. 8 and Transmission data area 201, received data area 202, Bit Table area 205, reassemble buffer 206 of FIG. 2 are common in FIG. 8 and FIG. 2 respectively. Management entry is mainly generated with the corresponding bit table at the time reassemble process starts and keeps the information until the reassemble process end.

Figure 9:
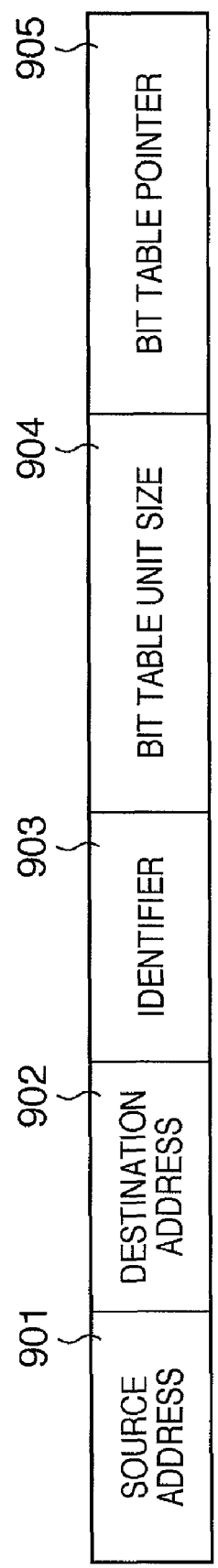
FIG. 9 shows a data construction of a management entry.

Next, using the FIG. 9, the relationship between management entries saved inside management table 803 and bit tables saved inside bit table area 804 is explained. FIG. 9 is a figure representing the details of the management entry saved inside management table 803.

Regarding FIG. 9, 901 is the source address, which is equal to the value in the source address field of the IP header. 902 is the destination address, similarly, which is equal to the value in the destination address field of the IP header. 903 is an identifier, similarly, which is equal to the identifier of the IP header. Source address 901, destination address 902, and identifier 903 are used for identifying the IP datagram subjected to reassembling.

904 is a unit size of bit table, which represents how many bytes are represented by one bit of the corresponding Bit Table. 905 is a bit table pointer, which indicates the corresponding Bit Table memory address saved inside the RAM 103.

Below, the relationship between Bit Table unit size 904 and Bit Table is explained by giving an example. Considering a case where bit table unit size 904 of predetermined management entry is 1 KB (=1024 byte). The bit table linked with aforementioned management entry (address of bit table that represented by bit table pointer 905) is considered to be in the state of 502 of FIG. 5.

In this situation, each of the bits 502-1, 502-2, 502-3, 502-4, 502-5 is corresponding to 1 KB payload data. Thus, already receiving the first 1 KB data part from the front of IP datagram within the payload is represented by setting the bit 502-1 to "1". Similarly, already receiving the 1 KB data part from the offset 3 KB is represented by setting the bit 502-4 to "1". On the other hand, not yet receiving the aforementioned 1 KB data part by bit 502-2, 503-2 and 502-5 is represented by the setting to "0".

Next, operations of the network protocol processing apparatus 100 when it is used as a transmission apparatus is explained. The transmission processes according to the present embodiment is also explained using FIG. 6, similar to first embodiment. Thus, the operations similar to the first embodiment are omitted from explanation since they are already explained while explain the first embodiment, here mainly the different operations are explained.

After connection is established, the CPU 101 conducts the path MTU search at step S601. In the path MTU search, DF flagged ICMP echo is sent while changing the IP packet size, and then path MTU is examined based on whether the source apparatus can receive an ICMP reply, which corresponds to the ICMP echo, from the transmission end apparatus.

In step S602, CPU 101 determines whether there are data needed to be transmitted in the communication data area 201 of RAM 103. In step S602, in case there are data needed to be transmitted, in step S603, from the path MTU size detected in step S601, the fragment size is calculated. Fragment size is the maximum number that is below (path MTU—24 byte) and dividable from 8 bytes without a remainder. Then, compare the calculated fragment size and the data size needed to be transmitted, which is saved on the transmission data area 801 in RAM 103.

In case the data need to be transmitted is evaluated in step S603 to be larger than the fragment size, at step S604, fragmentation operations in to fragment unit size is conducted by the CPU 101.

Then, in step S605 in response to fragmented data an IP header is generated, and then IP datagram is generated. When IP header is generated, CPU 101 set fragment size flag (1 byte) and fragment size (2 byte) in IP option. Thus, if an apparatus at the receiving end receives any one of fragmented datagram, the apparatus can know the fragment size of the following datagram.

The processes at step S606 and step S607 is similar to the steps of 1$^{st}$ embodiment. After activating DMAC 106 in Step S607, CPU 101 returns to the step S602 to evaluate whether there are any data need to be transmitted in the transmission data area 801 of RAM 103, in case there are data need to be transmitted, the above mentioned process is repeated.

Next, the operating method of the network protocol processing apparatus 100, when it is functioning as a receiving apparatus, will be discussed. When functioning as a receiving apparatus, some of the operations of the present embodiment are similar to the operations of the first embodiment. Thus, in present embodiment, when NO is selected in step S702, the process proceeds to step S708; and in step S709, without conducting the processes of step S710, the process proceeds to step S708.

When MAC 104 and PHY 105 receive a datagram (packet) an interruption signal is sent to notify the CPU 101. When CPU 101 receives the interruption signal DMAC 106 is activated, and then forwards the received IP datagram from MAC 104, PHY 105 to received data area 802 of RAM 103. When a datagram that should be processed is already in received data area 802 of RAM 103, receiving processes are conducted according to the flowchart of FIG. 7.

In step S701, an IP header analysis is conducted. In step S702, based on the analysis; it is determined whether IP datagram is fragmented. This determination can be conducted as in the first embodiment.

In step S702, in case it is decided the IP datagram is fragmented (YES in step S702), the step S703 is selected. On the other hand, in case IP datagram is determined to be none fragmentized (NO in Step 702), in present embodiment, method proceeds to step S708. In present embodiment, fragment size, is not obtained using a packet set as the MTU search identifier, it is obtained using the descriptions of an IP header of fragmented packets, and the process proceeds according to the above steps.

The processes of step S703 is similar to the corresponding process of first embodiment. For that reason, in case it is determined an entry in management table 803 does not exist in step S703, in the proceeding step S704, reassembling process is executed. Regarding reassemble initialization process, CPU creates a new management entry for the management table 803, the corresponding IP header information is saved in to the source address 901, the destination address 902, and the identifier 901 of the entry. In addition, in case fragment setting flag is set in IP options inside the IP header, the fragment size which is set in IP options is saved as the bit table unit size 904 of the generated management entry. In case fragment setting flag is not set in IP options inside the IP header, the minimum fragment size, in other words 8 bytes, is saved as the bit table unit size 904.

Next, CPU 101 extracts the bit table size from bit table unit size 904. Specifically, maximum IP datagram payload size 64 KB is divided by the bit table unit size 904. As an example, when bit table unit size 904 is 1 KB, the calculated bit table size is 64 (=64 KB/1 KB). Based on this bit table size, a bit table is created in the bit table area 804 and initialization is conducted. The bit table initialization set all the bits in bit table to "0". Finally, the bit table pointer 905 is set to the storage location address of the generated bit table. Then method is proceeds to step S705.

Reassemble process is conducted in step S705. In reassemble process, a management entry is searched for with source address 901, destination address 902 and identifier 903 that match with the source address, destination address, and identifier inside the IP header of the received datagram. Then, based on the bit table unit size 904 of the aforementioned management entry and the fragment offset inside the IP header, the corresponding bit of the bit table pointer 905 pointed bit table is set to "1". Here, in case the MF flag is set to "0" in received IP datagram, the bits below the corresponding bit is set to "1" and then proceeds to the step S706.

The operations conducted in steps S706~S708 are similar the corresponding process of first embodiment. Here, in step S702, pay load data of the IP datagram, which are determined to be not fragmentized, passed to the upper layer. Upper layer may have software conducting standard TCP processes; however this embodiment according to present invention is not limited to it.

As noted above, in present embodiment, the transmission apparatus, by including the breakup size information in a plurality of headers of fragments, notifies the break up size to the receiving apparatus. Then, the received apparatus reserves memory for bit table based on break up size included in the header of the received fragments. Due to this reason, according the present embodiment, the receiving apparatus may reserve a bit table just big enough size to satisfy the necessity based on the notified break up size, and as a result, make it possible to make the necessary bit table size small at the receiving apparatus.

As mentioned above, in the second embodiment, the transmission apparatus and the receiving apparatus share the information of fragmentation process conducting size after the path MTU search. Because of this, in receiving apparatus, the status of arrival of fragmented IP datagram (packets) can be managed using a shared unit size. Thus, the size of the bit table, which manages the status of arrival, can be reduced.

Here, the objective of the current invention can be achieved by software program code that runs on system or an apparatus that implements the above mentioned embodiments. In this case these program codes are included into the technical domain of the present invention.

Program code, as an example, can be recorded in to a recording media readable to a computer, and provide it to a system or an apparatus. This system or apparatus (or CPU or MPU) by reading the recorded program code can obtain the objectives of the present invention. Thus, the program code recorded recording media is also within the technical domain of the present invention.

As explained above, according to the present invention, when conducting reassemble process of network protocol processing, by constructing bit table bigger than 8 byte unit size, reducing the size of the bit table size is possible. As a result, the memory area necessary for reassemble can be reduced; also increasing the efficiency of network protocol processing and reduction of cost is also possible. Especially, the present invention is expected to be highly effective in embedded systems with memory limitations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-131274, filed on May 19, 2008, which is hereby incorporated by reference herein in its entirety.

What is claimed is:

1. A receiving apparatus receiving data separated into a plurality of fragments, comprising:
   a memory storing code of a computer program, and a processor that executes the code stored in the memory so as to execute the steps of:
   storing a bit table that is used for managing an arrival status of the plurality of fragments;
   detecting a fragment size of said fragments; and
   managing the arrival status of the plurality of received fragments with use of the bit table, wherein each one bit of said bit table represents the arrival status of each of the plurality of received fragments whose size is detected by the detecting step.

2. The receiving apparatus according to claim 1, wherein the detecting step detects said fragment size based on a packet size that is not allowed to be divided.

3. A receiving method executed by a receiving apparatus receiving data separated into a plurality of fragments, comprising the steps of:
   storing a bit table that is used for managing an arrival status of the plurality of fragments;
   detecting a fragment size of said fragments; and
   managing the arrival status of the plurality of received fragments with use of the bit table, wherein each one bit of said bit table represents the arrival status of each of the plurality of received fragments whose size is detected in the detecting step.

4. The method according to claim 3 wherein said fragment size is detected based on a packet size that is not allowed to be divided.

5. A communication method, executed between a transmission apparatus and a receiving apparatus, for communicating data separated into a plurality of fragments, comprising the steps of:
   at the transmission apparatus, transmitting a plurality of fragments; and
   at the receiving apparatus, storing a bit table that is used for managing an arrival status of the plurality of fragments, detecting a fragment size of said fragments, and managing the arrival status of the plurality of received fragments with use of the bit table, wherein each one bit of said bit table represents the arrival status of each of the plurality of received fragments whose size is detected in the detecting step.

6. The method according to claim 5, wherein said fragment size is detected based on a packet size that is not allowed to be divided.

7. A transmission apparatus for transmitting data that is separated into a plurality of fragments to a receiving apparatus, comprising:
   a memory storing code of a computer program, and a processor that executes the code stored in the memory so as to execute the steps of:
   fragmenting transmission data into a plurality of fragments with a predetermined size; and
   sending a notification to the receiving apparatus such that each one bit of a bit table, which is stored in the receiving apparatus and is used for managing an arrival status of the plurality of fragments, represents the arrival status of each of the plurality of received fragments of said predetermined size.

8. The transmission apparatus according to claim 7, wherein said notification is conducted by transmitting to said receiving apparatus a packet including one fragment and a header, which includes said predetermined size.

9. A transmission method, executed by a transmission apparatus, for transmitting data that is separated into a plurality of fragments to a receiving apparatus, comprising the steps of:
   fragmenting transmission data into a plurality of fragments with a predetermined size; and
   sending a notification to the receiving apparatus such that each one bit of a bit table, which is stored in the receiving apparatus and is used for managing an arrival status of the plurality of fragments, represents the arrival status of each of the plurality of received fragments of said predetermined size.

* * * * *